(12) United States Patent
Yamagishi et al.

(10) Patent No.: US 8,038,217 B2
(45) Date of Patent: Oct. 18, 2011

(54) VEHICLE SEAT

(75) Inventors: Atsuhiro Yamagishi, Aichi-ken (JP); Hideki Uramichi, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 228 days.

(21) Appl. No.: 12/593,068

(22) PCT Filed: Nov. 9, 2007

(86) PCT No.: PCT/JP2007/071792
§ 371 (c)(1),
(2), (4) Date: Sep. 25, 2009

(87) PCT Pub. No.: WO2008/120415
PCT Pub. Date: Oct. 9, 2008

(65) Prior Publication Data
US 2010/0109404 A1 May 6, 2010

(30) Foreign Application Priority Data

Mar. 29, 2007 (JP) .................................. 2007-087890

(51) Int. Cl.
*B60N 2/20* (2006.01)
(52) U.S. Cl. ................. 297/341; 297/378.12; 297/378.1
(58) Field of Classification Search .................. 297/341, 297/378.1, 378.12
See application file for complete search history.

(56) References Cited

U.S. PATENT DOCUMENTS

| 5,597,206 A | * | 1/1997 | Ainsworth et al. | ...... 297/378.12 |
| 6,152,533 A | | 11/2000 | Smuk | |
| 7,014,263 B2 | * | 3/2006 | Mukoujima et al. | .......... 297/341 |

(Continued)

FOREIGN PATENT DOCUMENTS

JP 2004-175300 6/2004

(Continued)

OTHER PUBLICATIONS

English language Abstract of JP 2005-323908, Nov. 24, 2005.

(Continued)

*Primary Examiner* — David Dunn
*Assistant Examiner* — Erika Garrett
(74) *Attorney, Agent, or Firm* — Greenblum & Bernstein, P.L.C.

(57) ABSTRACT

The present invention provides a vehicle seat capable of performing a tilt-down operation in which a seat back is widely tilted forwardly to be folded on a seat cushion while a seat cushion is moved forwardly and a walk-in operation in which the seat back is half tilted forwardly over a desired angle while the seat is slid forwardly via a slide rail. The seat includes a frame member that is capable of longitudinally sliding via the slide rail and that supports the seat back via a reclining device so as to tilt the seat back back and forth, a front link connecting the seat cushion to the frame member so as to allow the seat cushion to move longitudinally, and an interlock mechanism that can be controlled so as to move or to not move the seat cushion forwardly with respect to the frame member when the seat back is tilted forwardly. At the time of the tilt-down operation, the interlock mechanism is controlled so as to move the seat cushion forwardly when the seat back is tilted forwardly. At the time of the walk-in operation, the interlock mechanism is controlled so as to not move the seat cushion forwardly when the seat back is tilted forwardly.

3 Claims, 16 Drawing Sheets

U.S. PATENT DOCUMENTS

| | | | |
|---|---|---|---|
| 7,281,749 B2 * | 10/2007 | Yamada et al. | 296/65.05 |
| 7,374,244 B2 * | 5/2008 | Becker et al. | 297/341 |
| 7,512,923 B2 * | 3/2009 | Tsuchiya | 716/115 |
| 7,517,022 B2 * | 4/2009 | Habedank et al. | 297/378.12 |
| 7,562,926 B2 * | 7/2009 | Kojima | 296/65.13 |
| 7,604,293 B2 * | 10/2009 | Matsuhashi | 297/216.2 |
| 2004/0160104 A1 | 8/2004 | Mukoujima et al. | |
| 2004/0245829 A1 | 12/2004 | Haladuda et al. | |
| 2007/0284922 A1 * | 12/2007 | Matsuhashi | 297/216.2 |
| 2009/0051202 A1 | 2/2009 | Ozeki et al. | |

FOREIGN PATENT DOCUMENTS

| | | |
|---|---|---|
| JP | 2005-505459 | 2/2005 |
| JP | 2005-323908 | 11/2005 |
| JP | 2006-282020 | 10/2006 |

OTHER PUBLICATIONS

English language Abstract of JP 2006-282020, Oct. 19, 2006.
English language Abstract of JP 2005-505459, Feb. 24, 2005.
English language Abstract of JP 2004-175300, Jun. 24, 2004.

* cited by examiner

A-A Cross Section

VEHICLE SEAT

TECHNICAL FIELD

The present invention relates to a vehicle seat. More particularly, the present invention relates to a vehicle seat which enables a walk-in operation for allowing a passenger to get in and out a rear seat in addition to a tilt-down operation for retracting the seat.

BACKGROUND ART

An example of a vehicle seat of this type is known art taught by U.S. Pat. No. 6,152,533. In this art, a front portion of a seat cushion is connected to upper rail members of slide rails via links, and a rear portion of the seat cushion is connected to a seat back. That is, the seat cushion, the upper rail members, the links and the seat back may constitute a four-joints link mechanism. Further, the seat back is supported by a reclining device with respect to rear portions of the upper rail members of the slide rails.

In order to perform a tilt-down operation, the reclining device is unlocked so as to tilt the seat back forwardly. At this time, the four-joints link mechanism is operated, so that the seat cushion can be lowered toward a floor while the seat cushion moves forwardly. The seat back is folded on the seat cushion, so that the seat can be retracted in a folded condition.

In order to perform a walk-in operation, the reclining device is unlocked so as to tilt the seat back to a predetermined forwardly tilted condition. At the same time, slide lock devices of the slide rails are unlocked, so that the seat can be slid forwardly.

In the art taught by U.S. Pat. No. 6,152,533, when the seat back is tilted to the predetermined forwardly tilted condition in order to perform the walk-in operation, the four-joints link mechanism is operated as in the case of the tilt-down operation, so that the seat cushion moves forwardly. Thus, when the seat involved in the walk-in operation is a second row seat, a distance between a seat cushion of the second row seat and a first row seat can be closed up. Therefore, a forwardly sliding amount of the second row seat can be reduced by an amount corresponding to the closed up distance. As a result, ease of getting in and out a third row seat can be reduced.

Thus, there is a need in the art to prevent a forwardly sliding amount of a seat from being reduced when a walk-in operation is performed while a tilt-down operation can be conventionally performed.

SUMMARY OF THE INVENTION

The present invention provides a vehicle seat capable of performing a tilt-down operation in which a seat back is widely tilted forwardly to be folded on a seat cushion while a seat cushion is moved forwardly and a walk-in operation in which the seat back is half tilted forwardly over a desired angle while the seat is slid forwardly via a slide rail. The seat includes a frame member that is capable of longitudinally sliding via the slide rail and that supports the seat back via a reclining device so as to tilt the seat back back and forth, a front link connecting the seat cushion to the frame member so as to allow the seat cushion to move longitudinally, and an interlock mechanism that can be controlled so as to move or to not move the seat cushion forwardly with respect to the frame member when the seat back is tilted forwardly. At the time of the tilt-down operation, the interlock mechanism is controlled so as to move the seat cushion forwardly when the seat back is tilted forwardly. At the time of the walk-in operation, the interlock mechanism is controlled so as to not move the seat cushion forwardly when the seat back is tilted forwardly.

According to this structure, the seat cushion can be prevented from moving forwardly when the walk-in operation is performed while the tilt-down operation can be conventionally performed. Thus, a forwardly sliding amount of the seat from can be prevented from reducing when the walk-in operation is performed. As a result, at the time of the walk-in operation, property for allowing a passenger to get in and out can be reduced.

Preferably, the reclining device has an adjustable range in which the seat back can be set to an angle after the seat back is tilted back and forth with respect to the frame member. Further, the reclining device may preferably have a tilt-down operation range and a walk-in operation range that are respectively position in front of the adjustable range.

As a result, in addition to the tilt-down operation and the walk-in operation of the seat, a tilt angle of the seat back can be adjusted.

More preferably, the interlock mechanism is constructed such that in the adjustable range of the reclining device, the seat cushion can be moved longitudinally when the seat back is tilted back and forth.

In the adjustable range of the reclining device, the seat cushion moves back and forth in conjunction with tilting motion of the seat back. Therefore, the seat is comfortable to sit thereon.

More preferably, the interlock mechanism includes a rear link connecting a rear portion of the seat cushion to the seat back, a front spring imparting an elastic force to rotate the front link relative to the frame member such that seat cushion can always be biased backwardly, and a lock mechanism that is capable of precluding or enabling relative rotation of the seat cushion and the rear link. At the time of the tilt-down operation, the lock mechanism is actuated to maintain a condition in which the relative rotation of the seat cushion and the rear link is precluded. Conversely, at the time of the walk-in operation, the lock mechanism is deactuated to enable the relative rotation of the seat cushion and the rear link.

According to this structure, at the time of the walk-in operation, the lock mechanism is deactuated, so that the seat cushion and the rear link can be relatively rotated in conjunction with tilting motion of the seat back toward a forwardly tilted position. As a result, the seat cushion remains positionally unchanged without moving forwardly.

More preferably, the vehicle seat further includes a rear spring imparting an elastic force to rotate the seat cushion and the rear link relative to each other such that seat cushion can always be biased forwardly. The elastic force imparted to the seat cushion by the front spiral is set to be greater than the elastic force imparted to the seat cushion by the rear spiral.

According to this structure, when the walk-in operation is performed in, for example, the upright condition of the seat, the lock mechanism is deactuated. At this time, the seat cushion slightly shifted forwardly in the upright condition can be pushed back by a biasing force of the front spring. Therefore, the walk-in operation can be performed while the seat cushion is shifted to a rearward position.

More preferably, the rear link is constructed to contact a rod connected to the frame member when the seat back is half tilted in the walk-in operation.

According to this structure, when the walk-in operation is performed, the rear link can contact the rod, so that a half tilted angle of the seat back can be defined. That is, in this structure, movement paths of the rear link in the walk-in operation and the tilt-down operation are different from each other. Thus, tilt angles of the seat back can be changed by means of the rear link and the rod, so that the seat back can be stopped at a desired tilt angle at the time of the walk-in operation while the seat back can be widely tilted forwardly at the time of the tilt-down operation. Therefore, it is not necessary to provide a special stopper in order to define the half tilt angle at the time of the walk-in operation.

More preferably, upon relative rotation of the seat cushion and the rear link due to deactuation of the lock mechanism at the time of the walk-in operation, a slide lock device of the frame member on the slide rail can be unlocked.

As a result, it is not necessary to connect a walk-in operation lever to the slide lock device via, for example, a link mechanism, in order to unlock the slide lock device.

Figure 1:
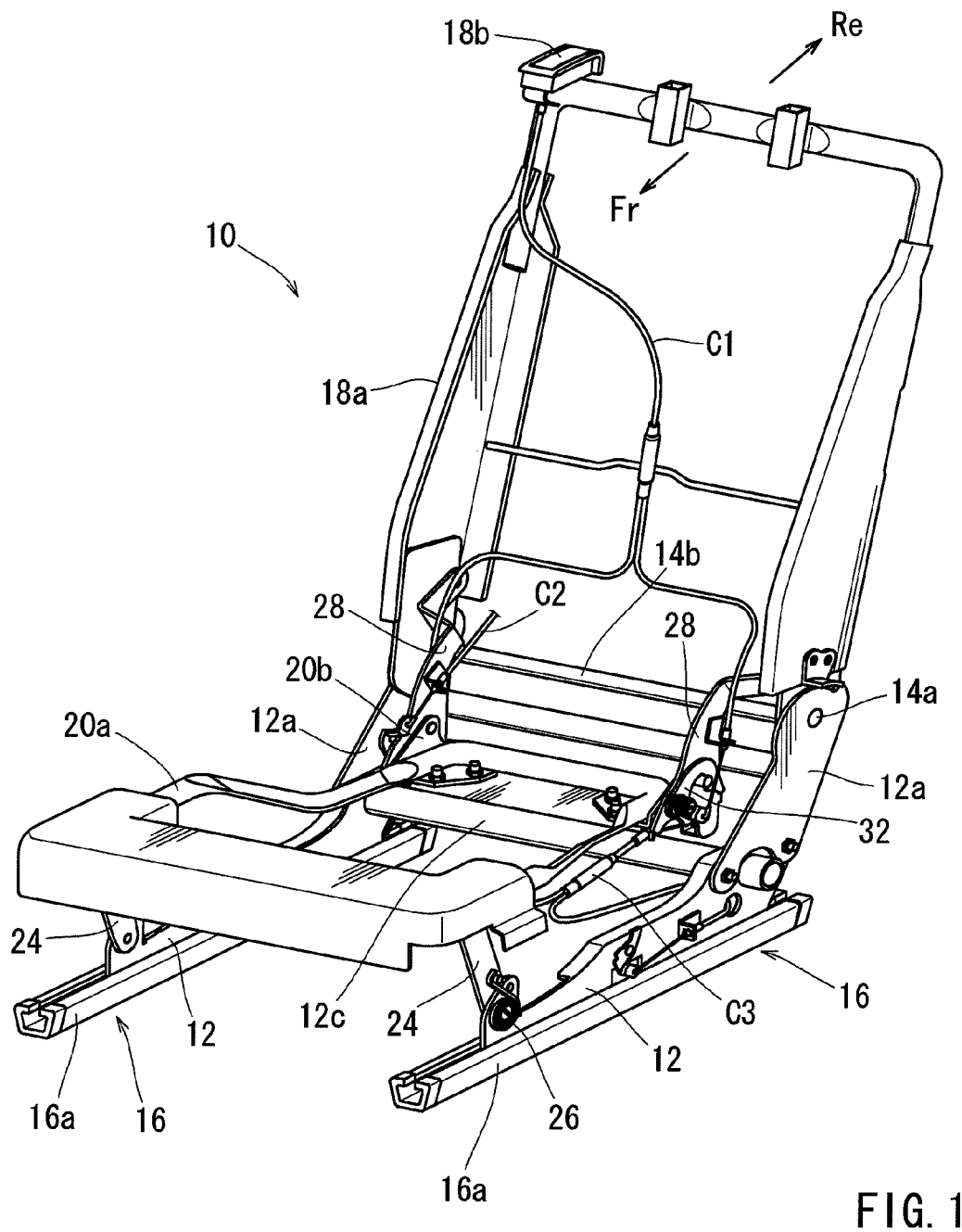
FIG. 1 is a perspective view of a frame structure of a vehicle seat.

REFERENCE NUMERALS 10 seat
12 frame member
14 reclining device
16 slide rail
18 seat back
20 seat cushion
22 lock pin (lock mechanism)
24 front link
26 spiral spring (front spring)
28 rear link
30 spiral spring (rear spring)
32 hook (lock mechanism)

BEST MODE FOR CARRYING OUT THE INVENTION

In the following, the best mode for carrying out the invention will be described with reference to the drawings.

A seat 10 shown in FIGS. 1 to 5 is a seat which enables a tilt-down operation and a walk-in operation. The seat 10 is essentially constructed of a seat back 18, a seat cushion 20, and frame members 12 that are disposed below the seat cushion 20. In these drawings and FIGS. 9 and 10 which will be referred to hereinafter, arrows Fr and Re respectively indicate forward and rearward of the seat 10.

The frame members 12 is composed of a pair of right and left frame members. The frame members 12 have lower arms 12a that are respectively fixed to rear portions thereof. Upper end portions of both lower arms 12a are respectively connected to upper arms 12b via reclining devices 14. Right and left lower portions of a back frame 18a of the seat back 18 are respectively fixed to both of the upper arms 12b. That is, both of the frame members 12 and the back frame 18a are connected each other via the right and left reclining devices 14. A reinforcement rod 12c is passed through the rear portions of both of the frame members 12 so as to extend therebetween. Both end portions of the reinforcement rod 12 and the frame members 12 are respectively connected to each other by welding. The reinforcement rod 12c is a member that is capable of withstanding a shock that is expected at the time of lateral collision of a vehicle so as to protect the seat 10. However, the reinforcement rod 12c can be used as a stopper that is capable of restricting a forwardly tilted position of the seat back 18 when the walk-in operation described hereinafter is performed.

The right and left reclining devices 14 respectively have main shafts 14a. The main shafts 14a of the reclining devices 14 are connected to each other via a connection rod 14b (FIG. 1), so as to be rotated in synchrony with each other. Further, a proximal end portion of an operation lever 14c is connected to the main shaft 14a of one (the right reclining device 14) of the reclining devices 14 (FIGS. 3 and 5) in an outer side of the lower arm 12a. An operation knob or other such members (not shown) are attached to a distal end portion of the operation lever 14c. When the operation lever 14c is rotated together with the main shafts 14a, the reclining devices 14 can be unlocked. When the reclining devices 14 are unlocked, the seat back 18 can be rotated back and forth about axes of the main shafts 14a of the reclining devices 14. As a result, the seat back 18 can be tilted back and forth.

Figure 3:
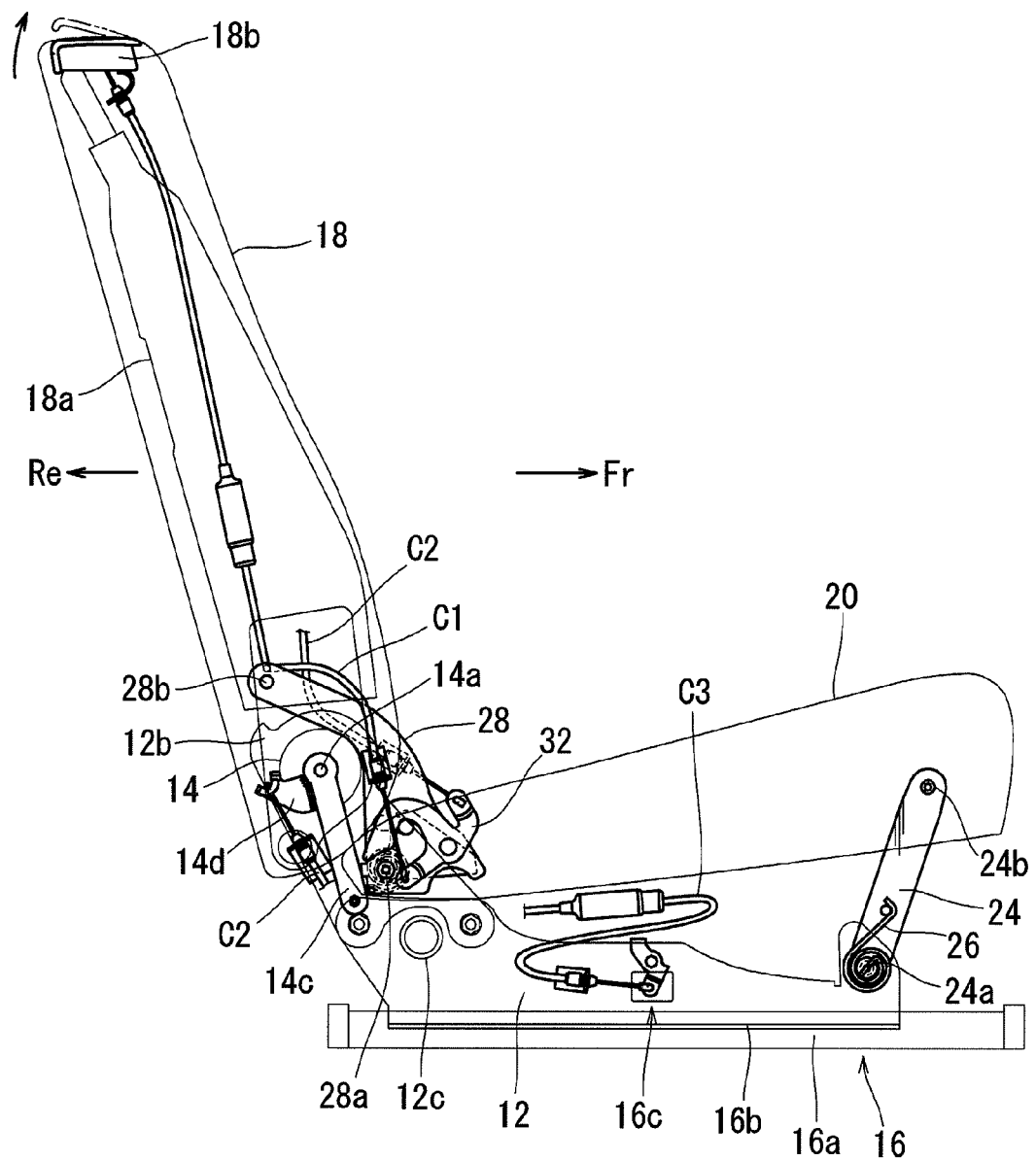
FIG. 3 is a side view of the vehicle seat, which is viewed from a right side thereof.
Figure 5:
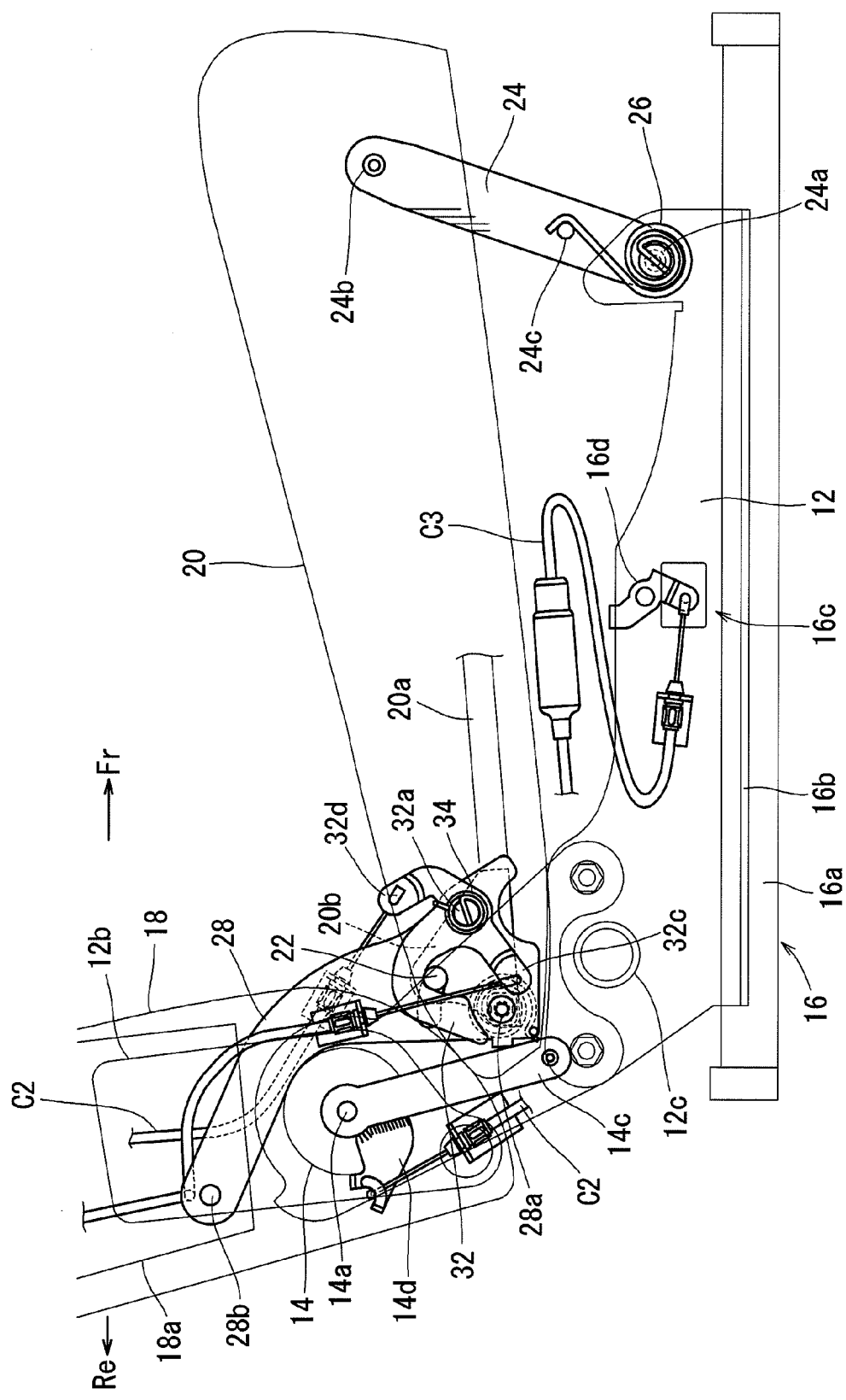
FIG. 5 is an enlarged side view of a portion of FIG. 3.

Further, the operation lever 14c has an arm portion 14d that integrally extends outwardly from a side portion thereof. An inner cable end of an operation cable C2 which will be described hereinafter is connected to a distal end of the arm portion 14d (FIGS. 3 and 5).

Figure 4:
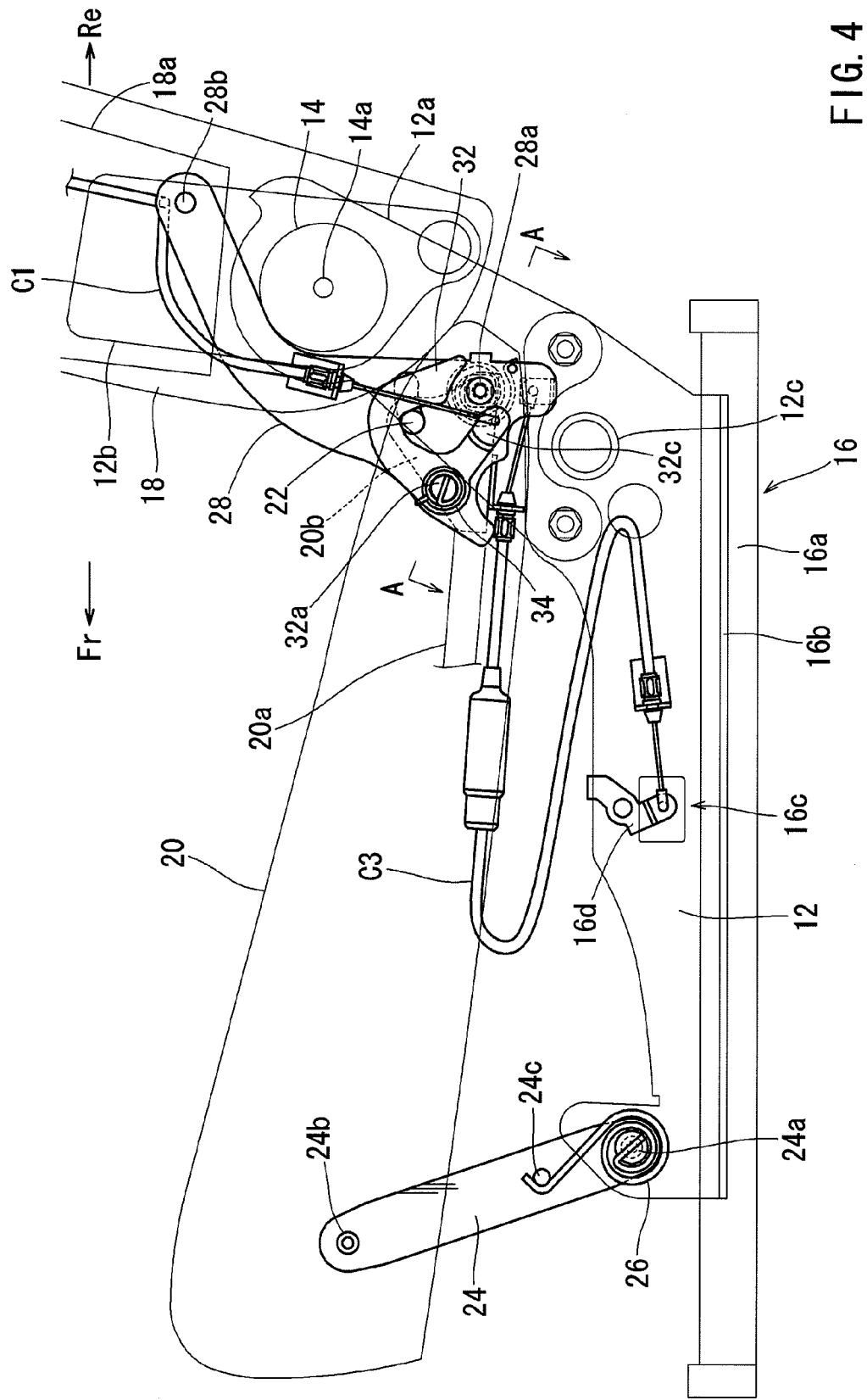
FIG. 4 is an enlarged side view of a portion of FIG. 2.

The frame members 12 are longitudinally slidable via right and left slide rails 16. Both of the slide rails 16 are constructed of lower rails 16a that are fixed to a floor of the vehicle and upper rails 16b that are formed in lower portions of the frame members 12, so that the upper rails 16b are capable of sliding along the lower rails 16a. The slide rails 16 respectively have slide lock portions 16c that are capable of locking the frame members 12 at arbitrary slide positions (FIGS. 4 and 5).

As will be well known, the slide lock portions 16c can be unlocked by operating a lever (not shown) for adjusting longitudinal positions of the seat 10. Aside from this, unlocking levers 16d are respectively disposed on side surfaces of the frame members 12. The unlocking levers 16d are respectively positioned adjacent to the slide lock portions 16c (FIGS. 4 and 5). The slide lock portions 16c can also be unlocked by rotating the unlocking levers 16d about their support shafts. Inner cable ends of an operation cable C3 which will be described hereinafter are connected to input end portions of the unlocking levers 16d.

As described above, the right and left lower portions of the back frame 18a of the seat back 18 are respectively fixed to the upper arms 12b. An operation lever 18b for performing the walk-in operation is disposed on a right side of an upper portion (an upper frame) of the back frame 18a. An inner cable end of an operation cable C1 which will be described hereinafter is connected to the operation lever 18b.

A cushion frame 20a of the seat cushion 20 is a rectangular frame (FIG. 1). Front portions of both sides of the cushion frame 20a are respectively connected to front portions of the frame members 12 via a pair of right and left front links 24. Further, rear portions of the sides of the cushion frame 20a are respectively connected to the both lower portions of the back frame 18a via a pair of right and left rear links 28. Thus, the cushion frame 20a and the back frame 18a constitute a five joints link mechanism together with the frame members 12, the front links 24 and the rear links 28.

One end portions of the right and left front links 24 are rotatably connected to connection shafts 24a that are fixed to the front portions of the frame members 12. The other end portions of the front links 24 are rotatably connected to the cushion frame 20a via connection shafts 24b. Spiral springs 26 (front springs) are respectively attached to both of the connection shafts 24a. Inner peripheral end portions of the spiral springs 26 are respectively connected to the connection shafts 24a. Conversely, outer peripheral end portions of the spiral springs 26 are respectively connected to spring engagement pins 24c of the front links 24 (FIGS. 4 and 5). The spiral springs 26 respectively impart elastic forces to the front links 24 such that the front links 24 can rotate about axes of the connection shafts 24a. Thus, the cushion frame 20a is biased backwardly of the seat 10.

Figure 6:
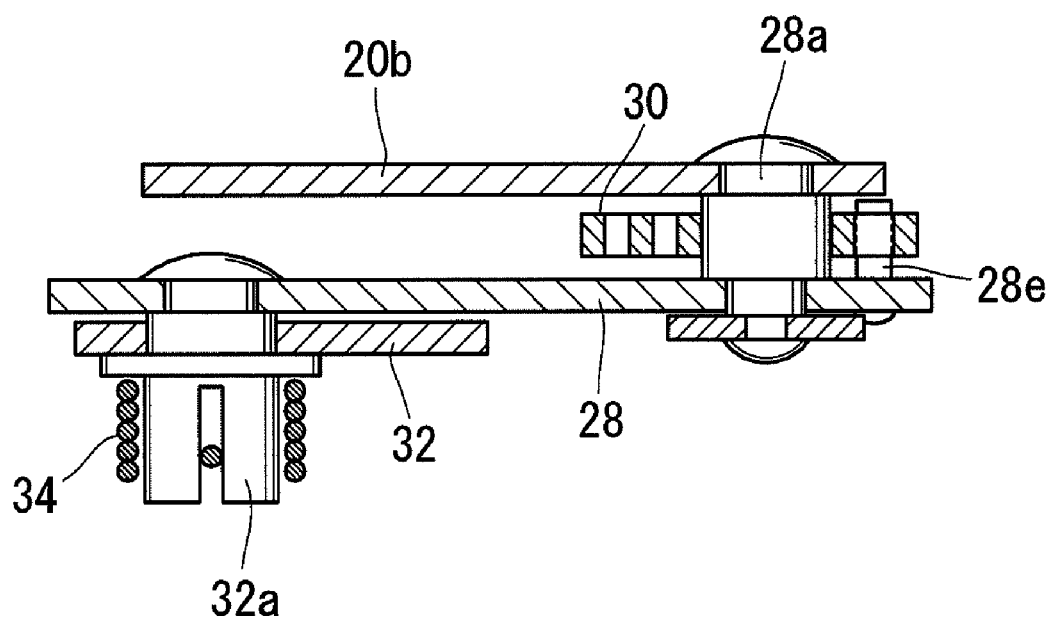
FIG. 6 is an enlarged sectional view taken along line A-A of FIG. 4.
Figure 7:
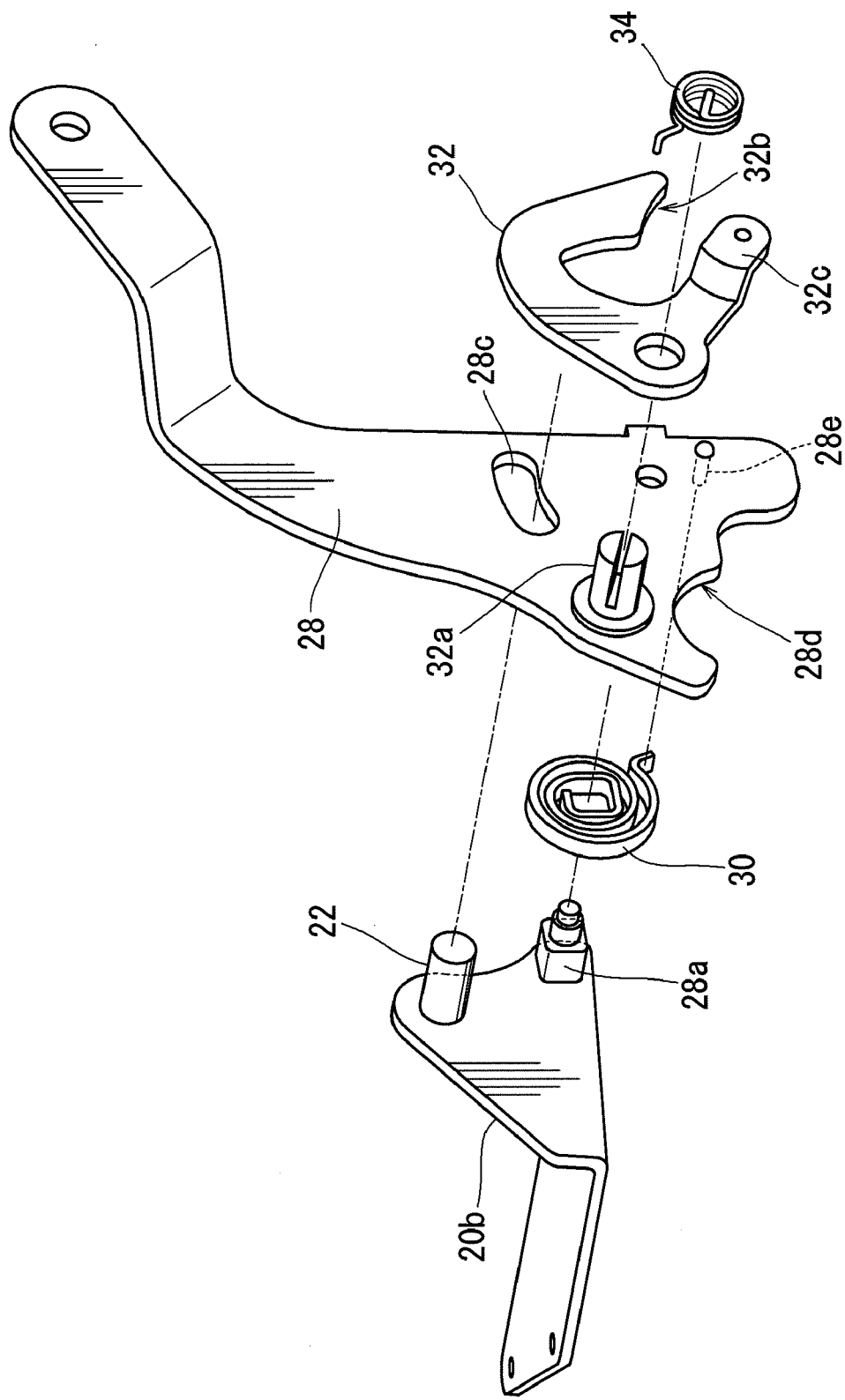
FIG. 7 is an exploded perspective view of a rear link and related members that are disposed on the left side of the seat.
Figure 8:
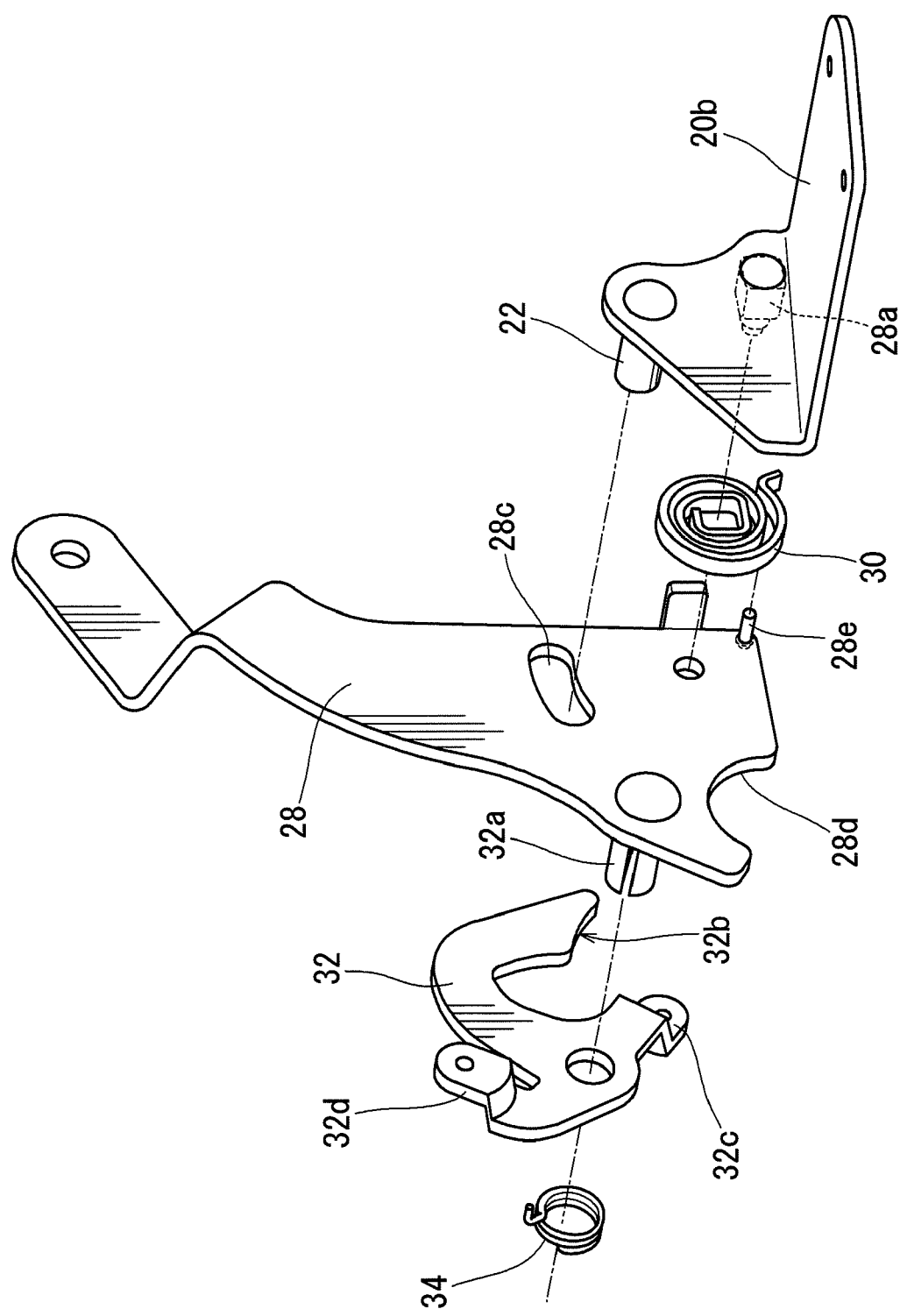
FIG. 8 is an exploded perspective view of a rear link and related members that are disposed on the right side of the seat.

Link bases 20b shown in FIGS. 6 to 8 may function to respectively support one end portions of the right and left rear links 28. The link bases are respectively fixed to the rear portions of the both sides of the cushion frame 20a. That is, one end portions of the rear links 28 are respectively rotatably connected to connection shafts 28a that are fixed to the link bases 20b. Conversely, the other end portions of the rear links 28 are respectively rotatably connected to the back frame 18a (the upper arms 12b) via connection shafts 28a. Spiral springs 30 (rear springs) are respectively attached to both of the connection shafts 28a. Inner peripheral end portions of the spiral springs 30 are respectively connected to rectangular outer peripheral surfaces of the connection shafts 28a. Conversely, outer peripheral end portions of the spiral springs 30 are respectively connected to spring engagement pins 28e of the rear links 28 (FIGS. 6 to 8). The spiral springs 30 respectively impart elastic forces to the rear links 28 such that the rear links 28 can rotate about axes of the connection shafts 28a. Thus, the cushion frame 20a is biased forwardly of the seat 10.

Further, the elastic forces imparted to the seat cushion 20 by the spiral springs 26 of the front links 24 is set to be greater than the elastic forces imparted to the cushion frame 20a (the seat cushion 20) by the spiral springs 30. That is, the force biasing the cushion frame 20a rearwardly with respect to the seat 10 is greater than the force biasing the cushion frame 20a forwardly with respect to the seat 10.

Figure 2:
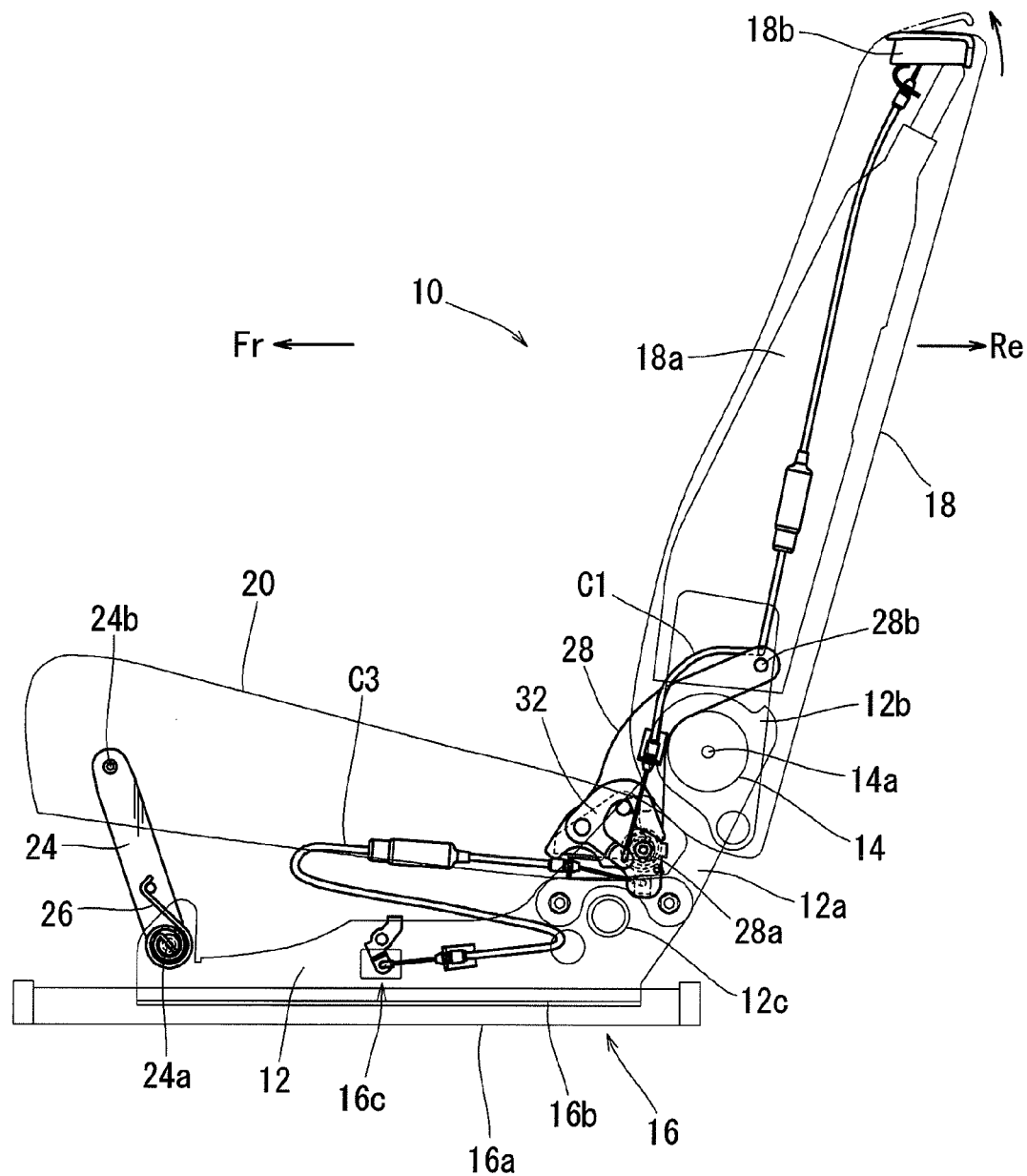
FIG. 2 is a side view of the vehicle seat, which is viewed from a left side thereof.

Both of the rear links 28 respectively have circular arc-shaped relief holes 28c that are respectively centered on the axes of the connection shafts 28a. Further, the rear links 28 have concaved circular arc-shaped contact surfaces 28d that are respectively formed in end surfaces corresponding to the connection shafts 28a. The contact surfaces 28d contact an outer circumferential surface of the reinforcement rod 12c of the frame members 12 when the rear links 28 rotate about the axes of the connection shafts 28a. Therefore, the contact surfaces 28d may function to restrict the forwardly tilted position of the seat back 18 when the walk-in operation described hereinafter is performed. The other inner cable end of the operation cable C3 described above is connected to the rear link 28 positioned on the left side of the seat 10 at an end portion corresponding to the connection shaft 28a (FIGS. 2 and 4).

Both of the link bases 20b respectively have lock pins 22 that are fixedly connected thereto. The lock pins 22 respectively project outwardly through the relief holes 28c of the rear links 28. Conversely, the rear links 28 are respectively provided with hooks 32 that are respectively capable of engaging the lock pins 22 of both link bases 20b. The hooks 32 are respectively rotatably supported on support shafts 32a that are respectively fixed to the rear links 28. Torsion coil springs 34 are respectively attached to the support shafts 32a. One end portions of the torsion coil springs 34 are respectively connected to the support shafts 32a. The other end portions of the torsion coils springs 34 are connected to the hooks 32. The torsion coil springs 34 respectively impart elastic forces to the hooks 32 such that the hooks 32 can rotate about axes of the support shafts 32a. The hooks 32 are respectively biased in a direction in which the hooks 32 can engage the lock pins 22.

In a condition in which the hooks 32 respectively engage the lock pins 22, the rear links 28 cannot rotate about the axes of the connection shafts 28a, so that relative rotation of the cushion frame 20a and both rear links 28 can be precluded. Thus, the hooks 32 and the lock pins 22 may function as a mechanism that precludes or enables the relative rotation of the seat cushion 20 and the rear links 28. Further, the hooks 32 and the lock pins 22 correspond to "a lock mechanism" of the present invention.

Further, "an interlock mechanism" of the present invention is essentially constructed of the spiral springs 26 (the front springs), the rear links 28 and "the lock mechanism." At the time of the tilt-down operation described hereinafter, "the interlock mechanism" can be controlled so as to move the seat cushion 20 forwardly when the seat back 18 is tilted forwardly. Conversely, at the time of the walk-in operation, "the interlock mechanism" can be controlled so as to not move the cushion 20 forwardly even when the seat back 18 is tilted forwardly.

As previously described, the cushion frame 20a and the back frame 18a constitute the five joints link mechanism together with the frame members 12, the front links 24 and the rear links 28. However, in a condition in which the relative rotation of the cushion frame 20a and the rear links 28 can be precluded, the cushion frame 20a and the back frame 18a can constitute a four-joints link mechanism together with the frame members 12, the front links 24 and the rear links 28 as in a conventional tilt-down seat. Further, the hooks 32 respectively have curved distal end surfaces 32b that are capable of contacting outer circumferential surfaces of the lock pins 22. In addition, the hooks 32 respectively have arm portions 32c (FIGS. 7 and 8). The other inner cable ends of the operation cable C1 described above are connected to the arm portions 32c (FIGS. 4 and 5). The hook 32 positioned on the right side of the seat 10 has an arm portion 32d in addition to the arm portion 32c. An inner cable end of the operation cable C2 described above is connected to the arm portion 32d (FIG. 5).

The operation cable C1 is arranged between the operation lever 18b attached to the upper portion of the back frame 18a and the right and left hooks 32 (the arm portions 32c). The operation cable C1 is branched off right and left at a middle portion thereof such that an operational force of the operation lever 18b can be transmitted to the hooks 32. The operation cable C2 is arranged between the operation lever 14c (the arm portion 14d) of the reclining device 14 positioned on the right side of the seat 10 and the hook 32 (the arm portion 32d) positioned on the right side of the seat 10. Rotational motion of one of the hooks 32 can be transmitted to the operation lever 14c via the operation cable C2. The operation cable C3 is arranged between the rear link 28 positioned on the left side of the seat 10 and the unlocking levers 16d of the right and left slide lock portions 16c. The operation cable C3 is also branched off right and left at a middle portion thereof such that rotational motion of one of the rear links 28 can be transmitted to the right and left unlocking levers 16d.

Next, an operation of each of the components member at the time of the walk-in operation will be described.

When the operation lever 18b for performing the walk-in operation is operated as shown by broken line in FIG. 2 or 3, the right and left hooks 32 are rotated about the axes of the support shafts 32a against biasing forces of the torsion coil springs 34 via the operation cable C1. As a result, engagement between both of the hooks 32 and the lock pins 22 is released, so that an integrated condition of the rear links 28 and the cushion frame 20a can be released. Thus, the rear links 28 can rotate about the axes of the connection shafts 28a with respect to the cushion frame 20a. Further, upon rotation of the hook 32 positioned on the right side of the seat 10, the operation lever 14c of one of the reclining devices 14 is rotated via the operation cable C2, so that the reclining devices 14 can be unlocked independently of a normal operation. As a result, the seat back 18 can be tilted about the axes of the main shafts 14a of the reclining devices 14.

Figure 9:
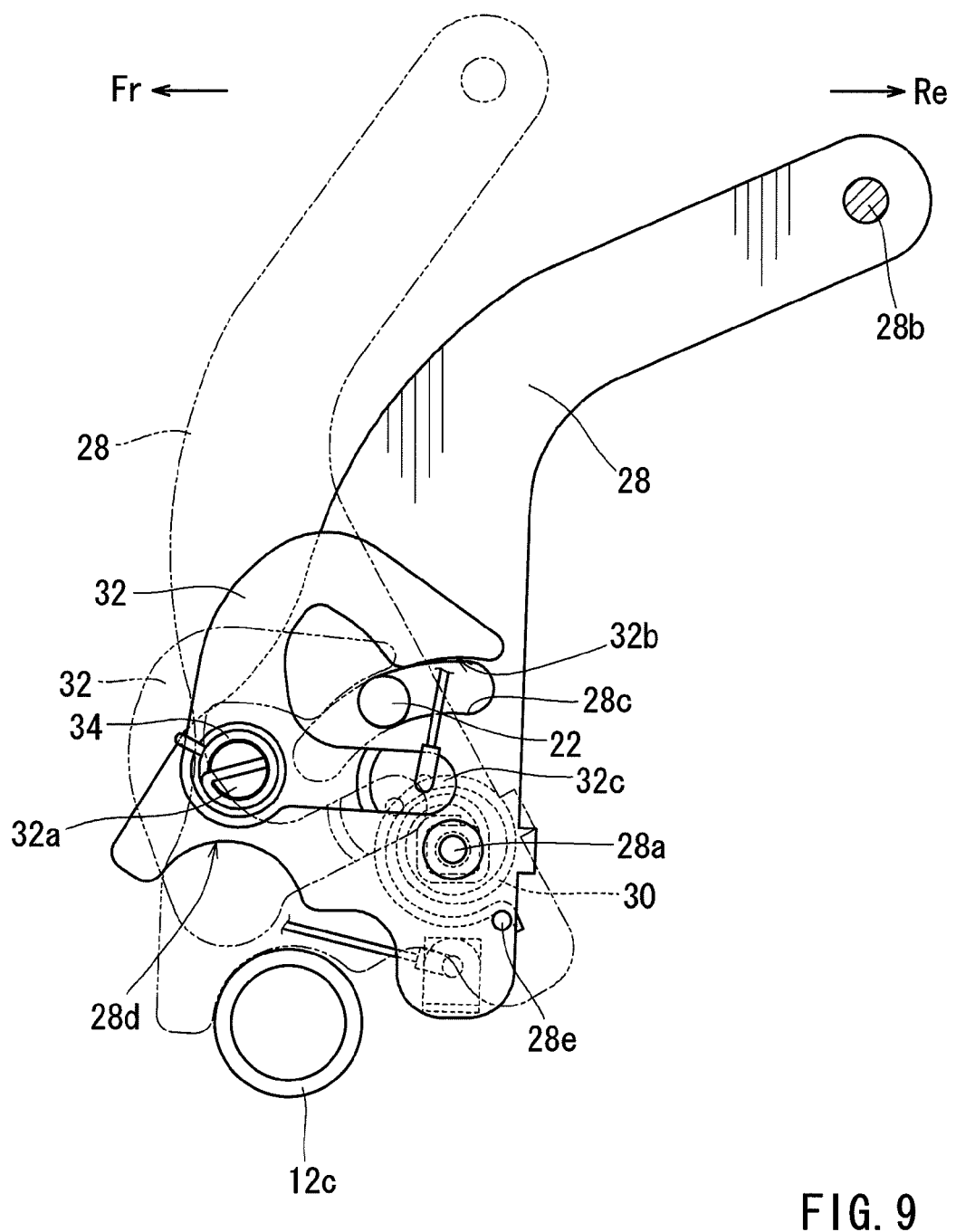
FIG. 9 is an enlarged side view of a lock mechanism that is disposed on the left side of the seat, which illustrates a deactuated condition thereof.
Figure 10:
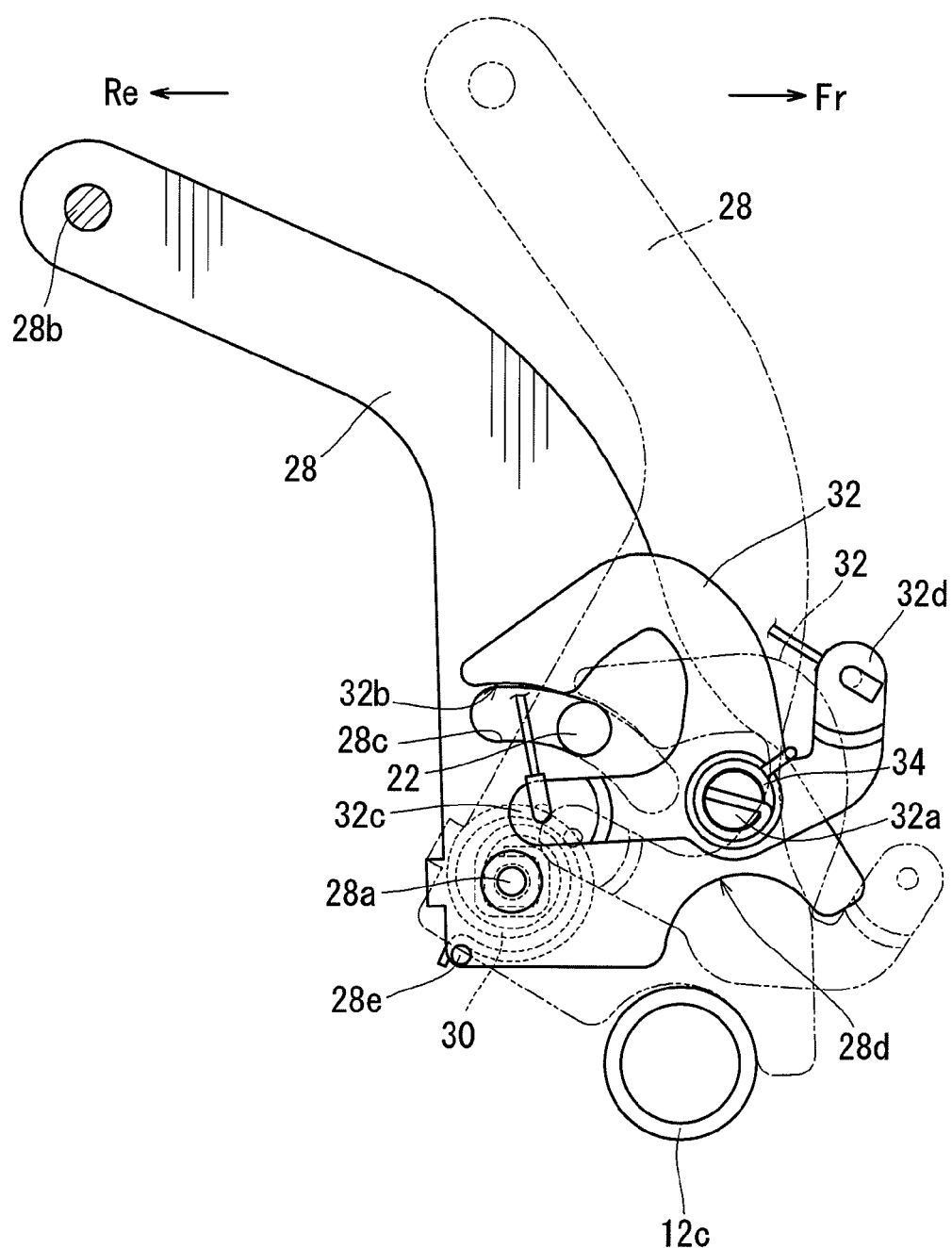
FIG. 10 is an enlarged side view of a lock mechanism that is disposed on the right side of the seat, which illustrates a deactuated condition thereof.

This condition is shown by solid lines in FIGS. 9 and 10. When the seat back 18 is tilted forwardly over a desired angle, both of the rear links 28 rotate about the axes of the connection shafts 28a against the biasing force of the spiral springs 30 in conjunction with this tilting motion, so as to be shifted to conditions shown by broken lines in FIGS. 9 and 10. At this time, the hooks 32 can rotate together with the rear links 28, so that the hooks 32 move relative to the lock pins 22. Therefore, at initial rotational conditions of the rear links 28, the distal end surfaces 32b of the hooks 32 respectively contact the outer circumferential surfaces of the lock pins 22. As a result, even if an operation of the operation lever 18b is stopped at an initial condition of the forward tilting motion of the seat back 18, both of the hooks 32 can be maintained in conditions shown by solid lines in FIGS. 9 and 10. The reclining devices 14 can also be maintained in unlocked conditions.

When the rear links 28 are rotated from the conditions shown by solid lines in FIGS. 9 and 10 to the conditions shown by broken lines in FIGS. 9 and 10, the contact surfaces 28d of both rear links 28 can respectively be received by the reinforcement rod 12c of the frame members 12. Thus, a forwardly half tilted angle of the seat back 18 can be defined via the rear links 28 when the walk-in operation is performed.

Further, when the rear link 28 positioned on the left side of the seat 10 is rotated to the condition shown by broken lines in FIG. 9, the unlocking levers 16d of the slide lock portions 16c of the right and left slide rails 16 are respectively moved in unlocking directions via the operation cable C3. As a result, engagement of the lower rails 16a and the upper rails 16b of the slide rails 16 is released, so that the frame members 12, i.e., the seat 10, can be longitudinally slid. Thus, when the rear links 28 are rotated in conjunction with the forward tilting motion of the seat back 18, the slide lock portions 16c can be unlocked independently of a normal lever operation.

When seat back 18 is returned from a condition in which the seat back 18 is half tilted forwardly to a normal condition shown in, for example, FIGS. 2 and 3, both of the rear links 28 rotate about the axes of the connection shafts 28a in conjunction with this motion and are returned from the conditions shown by broken lines in FIGS. 9 and 10 to the conditions shown by solid lines in FIGS. 9 and 10. At this time, the lock pins 22 are spaced from the distal end surfaces 32b of both hooks 32 and the hooks 32 are rotated toward original conditions by the biasing forces of the torsion coil springs 34. Thus, the hooks 32 respectively engage the lock pins 22, so that the integrated condition of the rear links 28 and the cushion frame 20a can be obtained again.

Further, when the rear link 28 positioned on the left side of the seat 10 is returned to the condition shown by solid lines in FIG. 9, operational forces applied to the right and left unlocking levers 16d via the operation cable C3 can be removed. Thus, the slide lock portions 16c of the slide rails 16 can respectively be maintained in locked conditions again. Conversely, when the hook 32 positioned on the right side of the seat 10 is returned from the condition shown by solid lines in FIG. 10 to a condition in which the hook 32 engages the lock pin 22, an operational force applied to the operation lever 14c of the reclining device 14 via the operation cable C2 can be removed. As a result, the right and left reclining devices 14 are returned to original locked conditions.

Next, operations for adjusting tilt angles of the seat back 18 of the seat 10, the tilt-down operation and the walk-in operation will be described with reference to mainly FIGS. 11 to 16.

Figure 11:
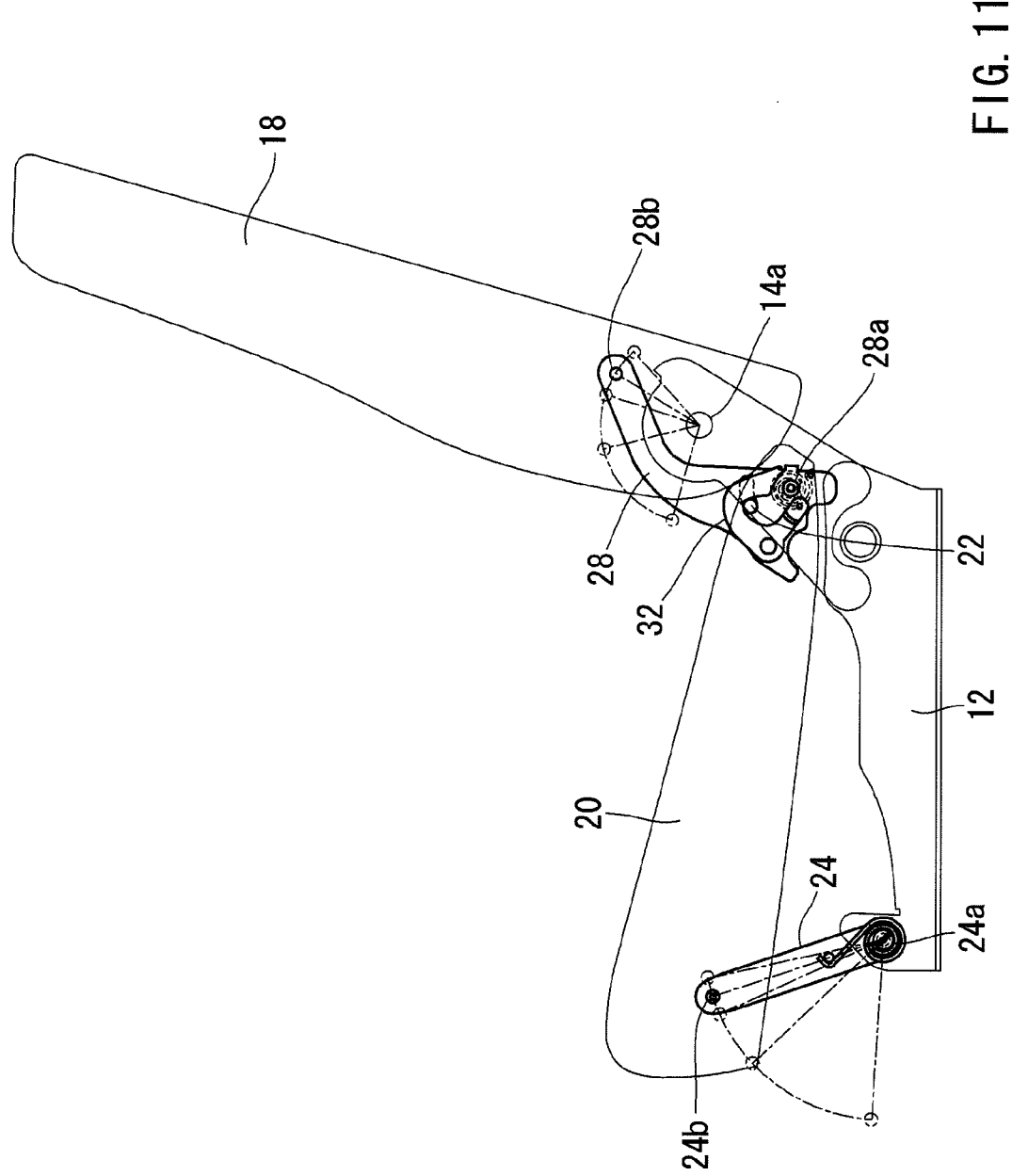
FIG. 11 is a side view of the seat, which illustrates a neutral condition of a seat back.
Figure 12:
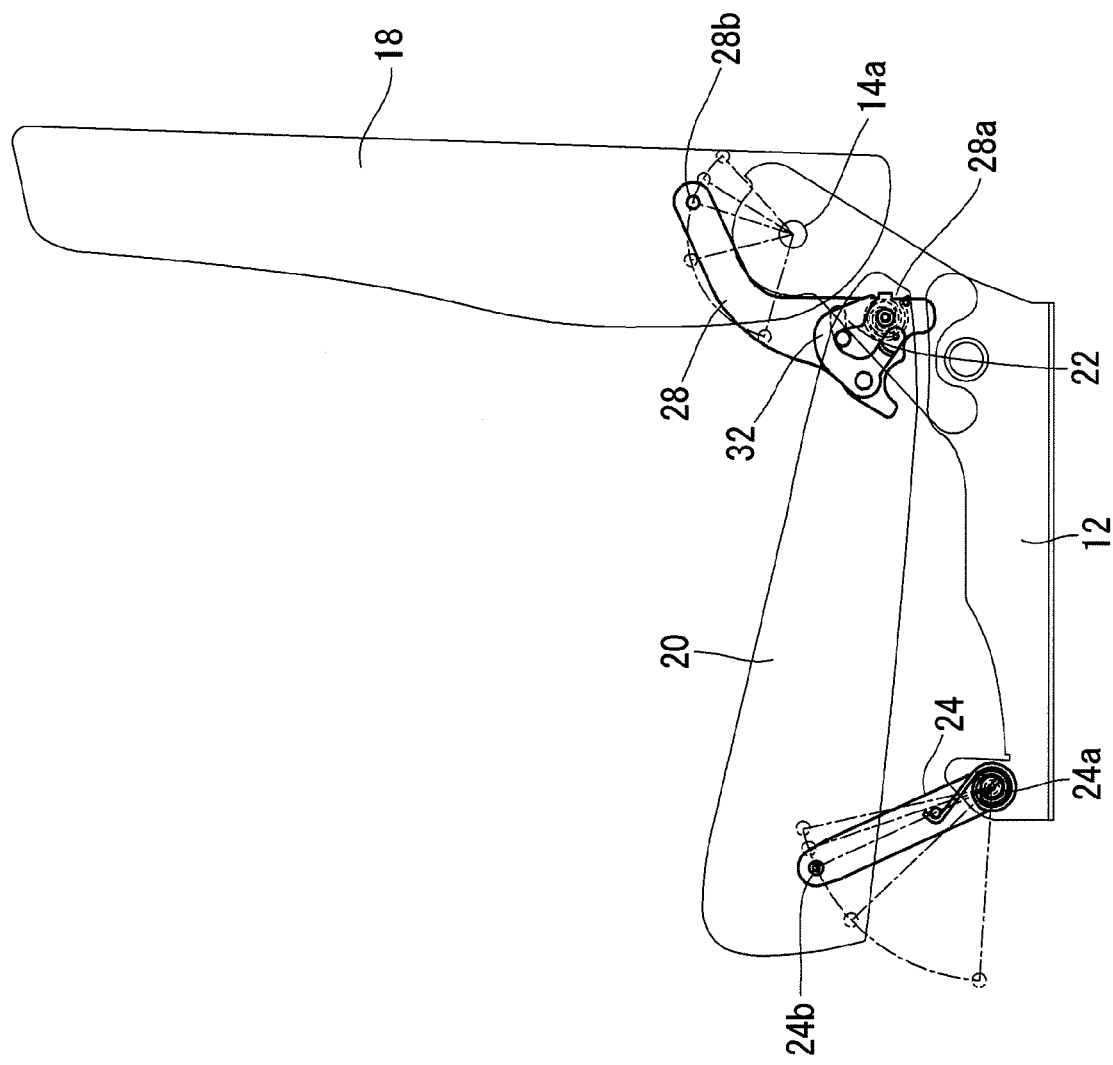
FIG. 12 is a side view of the seat, which illustrates an upright condition of the seat back.
Figure 13:
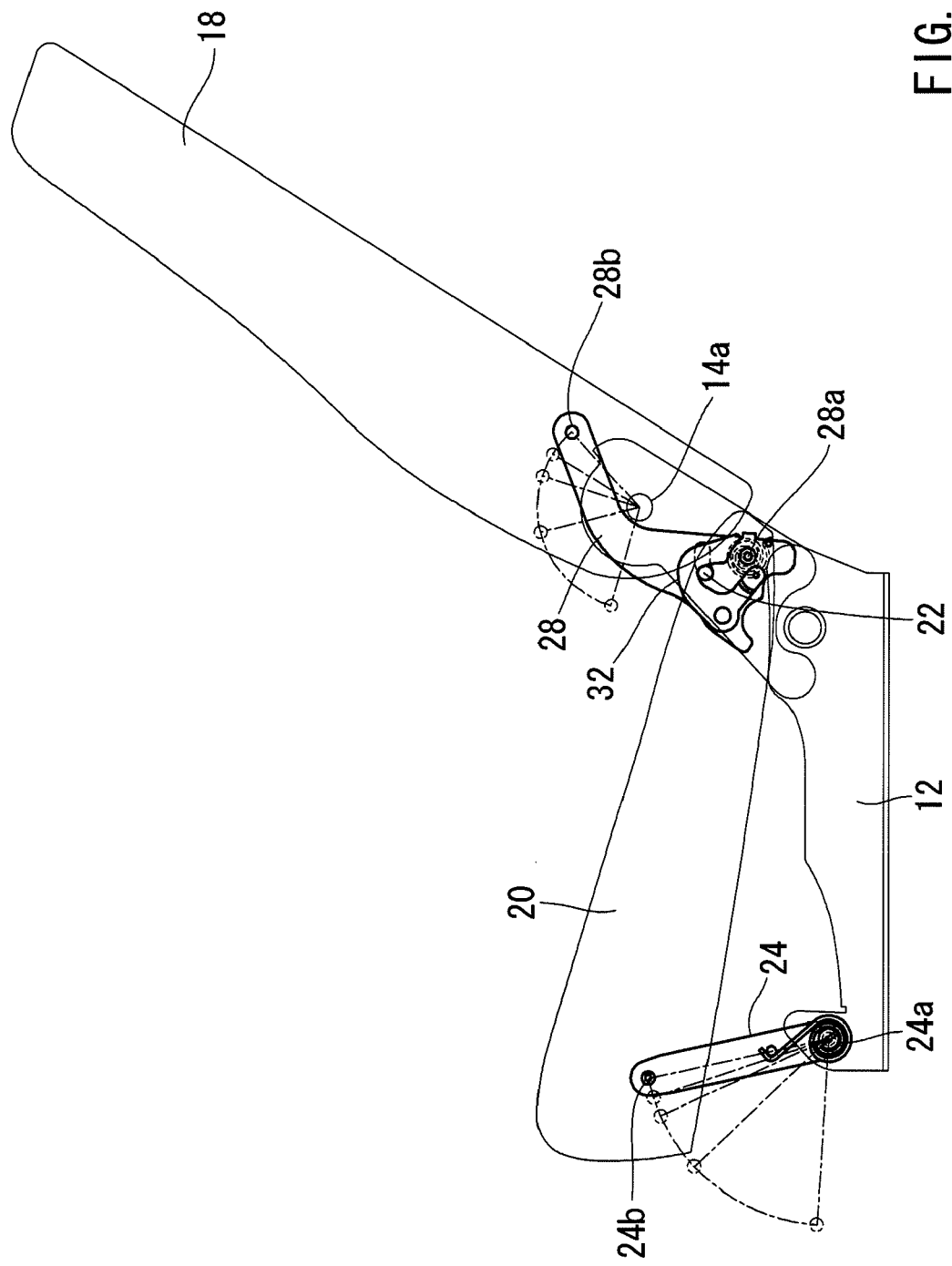
FIG. 13 is a side view of the seat, which illustrates a farthest tilt-back condition of the seat back.
Figure 14:
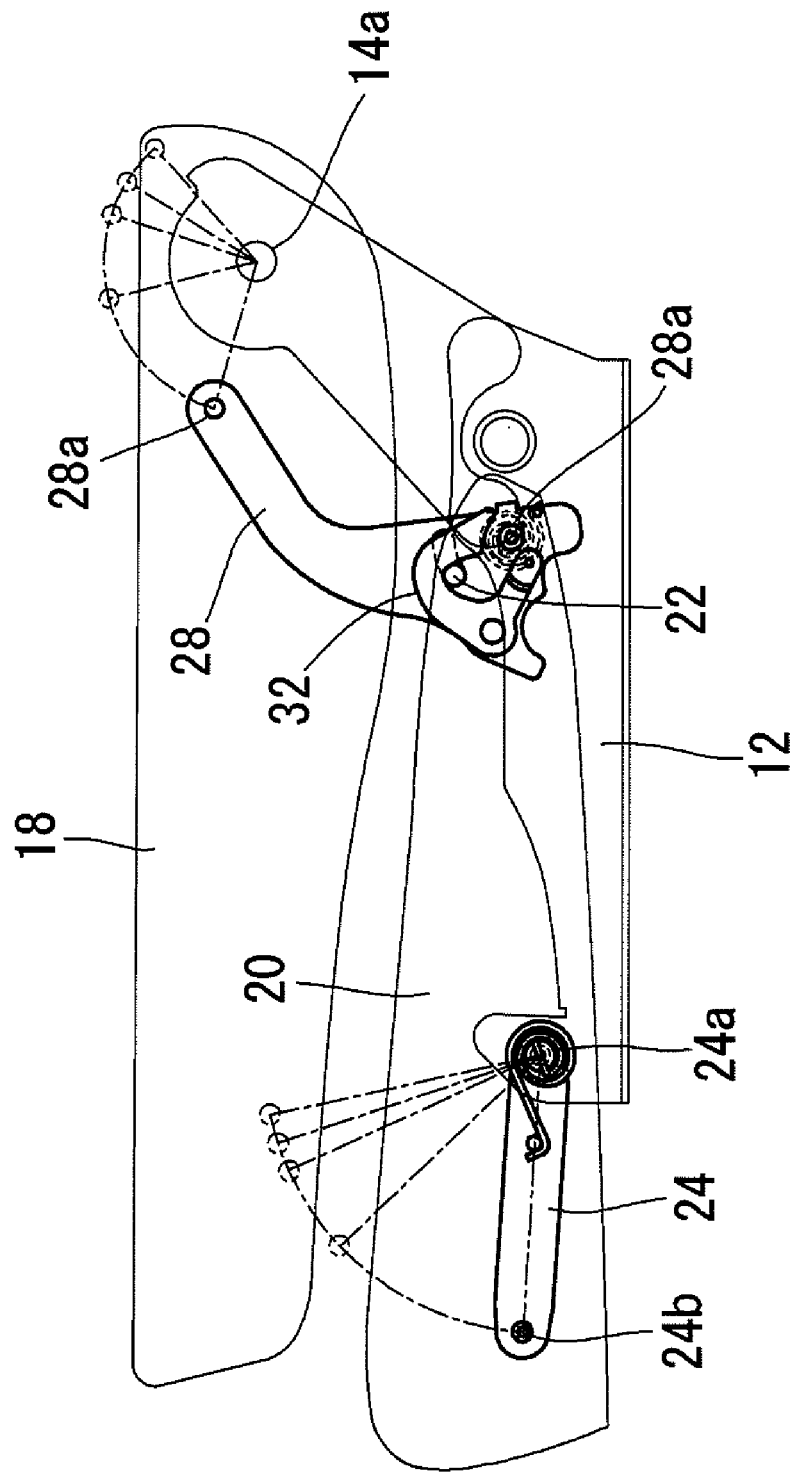
FIG. 14 is a side view of the seat, which illustrates a tilt-down condition thereof.
Figure 15:
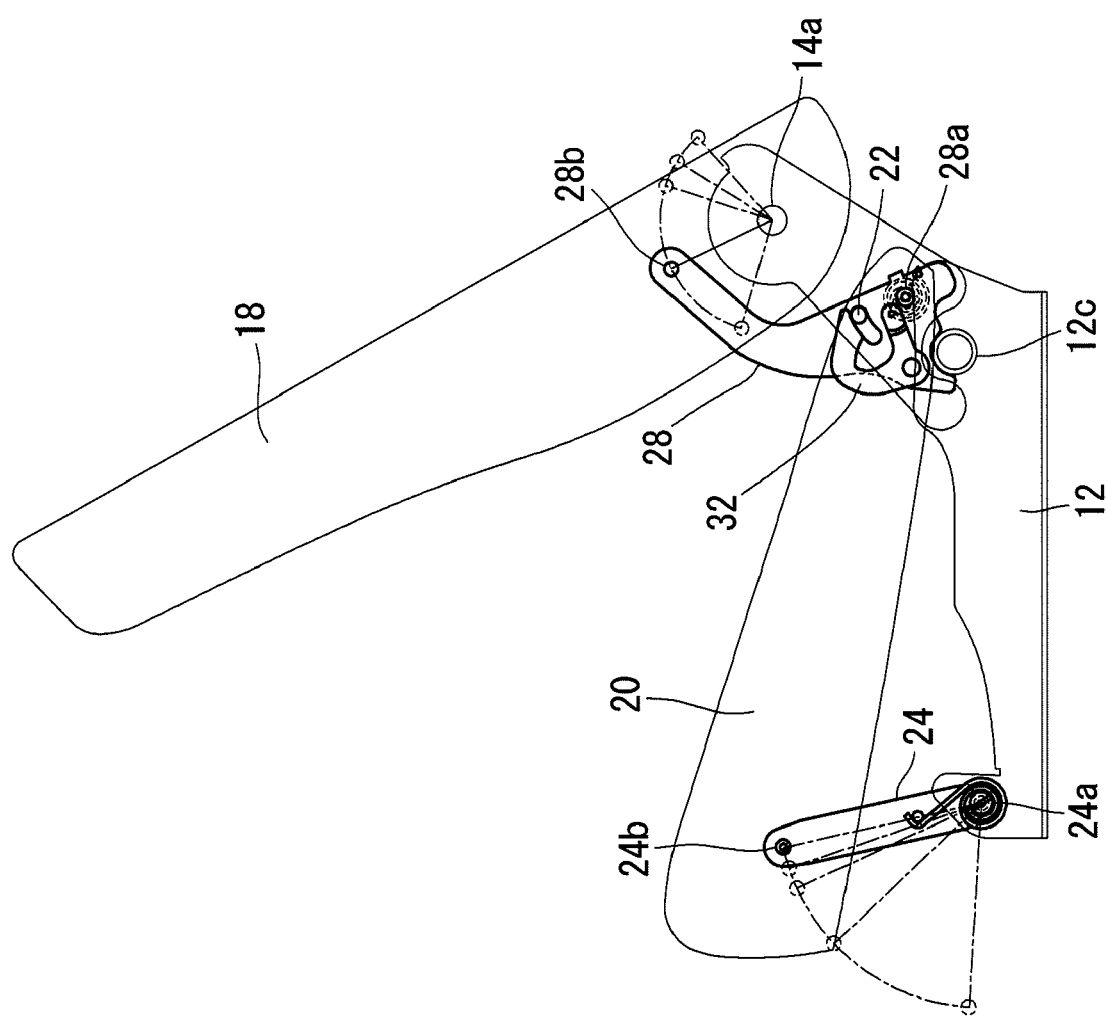
FIG. 15 is a side view of the seat, which illustrates a walk-in condition thereof.

The seat 10 can be positioned in a neutral condition shown in FIG. 11, an upright condition shown in FIG. 12 and a farthest tilt-back condition shown in FIG. 13 depending on the tilt angles of the seat back 18. Further, as will be appreciated, the seat can be positioned in a tilt-down condition shown in FIG. 14 and a walk-in condition shown in FIG. 15. Except for the tilt-down condition and the walk-in condition which will be described hereinafter, the neutral condition corresponds to a condition in which the seat 10 is normally used similar to the condition shown in, for example, FIGS. 2 and 3. The upright condition corresponds to a condition in which the reclining devices 14 are locked first when the seat back 18 is raised from, for example, the tilt-down condition. Further, the farthest tilt-back condition corresponds to a condition in which the seat back 18 is tilted to a farthest rearward rotational position.

Further, in each of the neutral condition, the upright condition and the farthest tilt-back condition, the hooks 32 and the lock pins 22 constituting "the lock mechanism" engage each other, the cushion frame 20a and the rear links 28 are maintained in a condition in which the relative rotation thereof can be precluded. Therefore, as previously described, the cushion frame 20a and the rear links 28 is maintained in the integrated condition, so as to form the four-joints link mechanism together with the back frame 18a, the frame members 12 and the front links 24.

Figure 16:
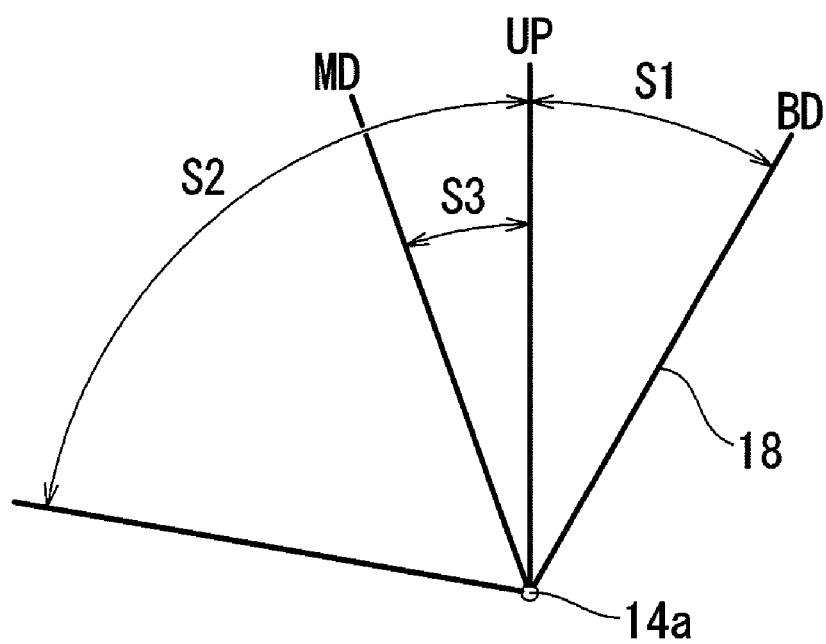
FIG. 16 is an explanatory view, which schematically illustrates a relation between tilt angles of the seat back and respective operation ranges.

As shown in FIG. 16, each of the reclining devices 14 has an adjustable range S1 in which the seat back 18 can be set to a desired tilt angle between the upright condition UP and the farthest tilt-back condition BD, and has a tilt-down operation range S2 and a walk-in operation range S3 that are respectively position in front of the adjustable range S1. In order to adjust the tilt angles of the seat back 18 in the adjustable range S1, the operation lever 14c of one of the reclining device 14 is operated to unlock the reclining devices 14. Thereafter, the seat back 18 is rotated about the main shafts 14a of the reclining devices 14. After the seat back 18 is rotated to a desired rotation angle, an operation of the operation levers 14c is discontinued. Thus, the reclining devices 14 are locked again, so that the seat back 18 can be maintained in the rotation angle. Further, in the adjustable range S1, the four-joints link mechanism is constructed as described above. Therefore, when the seat back 18 is tilted back and forth, the seat cushion 20 moves longitudinally with respect to the frame members 12.

In the farthest tilt-back condition BD of the seat 10, the seat cushion 20 is moved to a farthest rearward position. Therefore, the front links 24 are also rotated to farthest rearward rotational positions about the axes of the connection shafts 24a thereof. In this condition, the front links 24 contact stoppers (not shown) that are fixed to the frame members 12, so as to be restricted from being further rotated. As a result, even if the reclining devices 14 are unlocked in the farthest tilt-back condition BD, the seat 10 is prevented from being further tilted back due to behavior of the four-joints link mechanism.

In order to perform the tilt-down operation in, for example, the upright condition of the seat 10, the operation lever 14c of one of the reclining devices 14 is operated to unlock the reclining devices 14. As a result, the seat back 18 is rotated forwardly about the main shafts 14a of the reclining devices 14, so as to be widely tilted forwardly. At this time, because the hooks 32 and the lock pins 22 remain engaged with each other, the seat cushion 20 moves forwardly due to the behavior of the four-joints link mechanism cause by rotation of the seat back 18. Thus, when the seat back 18 is completely folded on the seat cushion 20, the seat 10 can be shifted to the tilt-down condition shown in FIG. 14. In the tilt-down condition, the front links 24 are rotated to farthest forward rotational positions about the axes of the connection shafts 24a against elastic forces of the spiral springs 26.

In order to perform the walk-in operation in, for example, the upright condition of the seat 10, the operation lever 18b disposed on a shoulder of the seat back 18 is operated. As a result, the hooks 32 constituting "the lock mechanism" as described above can rotate, so as to be disengaged from the lock pins 22. Further, because the reclining devices 14 can be unlocked when the hooks 32 rotate, the seat back 18 can be shifted to a forward half tilting condition MD (FIG. 16). At this time, as previously described, the rear links 28 rotate about the axes of the connection shafts 28a with respect to the cushion frame 20a in conjunction with the tilting motion of the seat back 18. Therefore, the seat cushion 20 does not move forwardly. In addition, the front links 24 do not rotate about the axes of the connection shafts 24a of the front links 24. Further, because the slide lock portions 16c of the slide rails 16 are unlocked when the rear links 28 rotate, the seat 10 can be slid forwardly, so as to be shifted to the walk-in condition shown in FIG. 15.

Thus, unlike the tilt-down operation, when the walk-in operation is performed, the seat cushion 20 can remain positionally unchanged without moving forwardly even when the seat back 18 is tilted forwardly. Therefore, a forwardly sliding amount of the seat 10 can be effectively prevented from reducing, so that the seat 10 may have a desired forwardly sliding amount. As a result, property for allowing a passenger to get in and out a rear seat can be reduced in the walk-in condition.

In the neutral condition of the seat 10 shown in FIG. 11, the front links 24 are slightly inclined forwardly. Conversely, in the upright condition of the seat 10 shown in FIG. 12, the front links 24 are further inclined forwardly. That is, the seat cushion 20 in the upright condition is shifted more forwardly than the seat cushion 20 in the neutral position. Therefore, when the walk-in operation is performed in the neutral condition or the upright condition, the sliding amount of the seat 10 can be reduced by a previously-shifted amount of the seat cushion 20.

However, as described above, in this embodiment, the forces of the spiral springs 26 of the front links 24 biasing the seat cushion 20 rearwardly is set to be greater than the forces the spiral springs 30 of the rear links 28 biasing the seat cushion 20 forwardly. Therefore, even if the walk-in operation is performed in, for example, the upright position, the seat cushion 20 can be pushed back by the biasing forces of the spiral springs 26 when the hooks 32 are disengaged from the lock pins 22 during the walk-in operation. As a result, in the walk-in condition shown in FIG. 15, the seat cushion 20 can be shifted to the farthest rearward position.

The invention claimed is:

1. A vehicle seat capable of performing a tilt-down operation in which a seat back is widely tilted forwardly to be folded on a seat cushion while a seat cushion is moved forwardly and a walk-in operation in which the seat back is half tilted forwardly over a desired angle while the seat is slid forwardly via a slide rail, comprising:
   a frame member that is capable of longitudinally sliding via the slide rail and that supports the seat back via a reclining device so as to tilt the seat back back and forth;
   a front link connecting the seat cushion to the frame member so as to allow the seat cushion to move longitudinally; and
   an interlock mechanism that can be controlled so as to move or to not move the seat cushion forwardly with respect to the frame member when the seat back is tilted forwardly,
   wherein the interlock mechanism includes a rear link connecting a rear portion of the seat cushion to the seat back, a front spring imparting an elastic force to rotate the front link relative to the frame member such that seat cushion can always be biased backwardly, and a lock mechanism that is capable of precluding or enabling relative rotation of the seat cushion and the rear link,
   wherein at the time of the tilt-down operation, the lock mechanism is actuated to maintain a condition in which the relative rotation of the seat cushion and the rear link is precluded, and wherein at the time of the walk-in operation, the lock mechanism is deactuated to enable the relative rotation of the seat cushion and the rear link, and
   wherein the vehicle seat further comprises a rear spring imparting an elastic force to rotate the seat cushion and the rear link relative to each other such that seat cushion can always be biased forwardly, and wherein the elastic force imparted to the seat cushion by the front spiral is set to be greater than the elastic force imparted to the seat cushion by the rear spiral.

2. The vehicle seat as defined in claim 1, wherein the rear link is constructed to contact a rod connected to the frame member when the seat back is half tilted in the walk-in operation.

3. The vehicle seat as defined in claim 1, wherein upon relative rotation of the seat cushion and the rear link due to deactuation of the lock mechanism at the time of the walk-in operation, a slide lock device of the frame member on the slide rail can be unlocked.

* * * * *